United States Patent
Zonkoski et al.

(10) Patent No.: US 8,436,586 B2
(45) Date of Patent: May 7, 2013

(54) NO DRAIN POWER SAVER

(76) Inventors: John Zonkoski, La Habra, CA (US);
Joan Kaye Russell, La Habra, CA (US)

(*) Notice: Subject to any disclaimer, the term of this patent is extended or adjusted under 35 U.S.C. 154(b) by 531 days.

(21) Appl. No.: 12/357,073

(22) Filed: Jan. 21, 2009

(65) Prior Publication Data
US 2009/0184684 A1 Jul. 23, 2009

Related U.S. Application Data

(60) Provisional application No. 61/022,500, filed on Jan. 21, 2008, provisional application No. 61/022,488, filed on Jan. 21, 2008.

(51) Int. Cl.
*H02J 7/04* (2006.01)
*H02H 7/18* (2006.01)

(52) U.S. Cl.
USPC .......................... 320/134; 320/136; 307/10.7

(58) Field of Classification Search ........... 320/127–136
See application file for complete search history.

(56) References Cited

U.S. PATENT DOCUMENTS

| | | | | |
|---|---|---|---|---|
| 3,771,012 A * | 11/1973 | Niederjohn | ................. | 315/86 |
| 3,925,772 A * | 12/1975 | Miller et al. | ............. | 340/636.15 |
| 5,656,915 A * | 8/1997 | Eaves | ............................. | 320/118 |
| 6,492,791 B1* | 12/2002 | Saeki et al. | ................... | 320/135 |
| 2008/0211459 A1* | 9/2008 | Choi | ............................. | 320/134 |
| 2009/0296442 A1* | 12/2009 | Chang et al. | ................... | 363/142 |
| 2010/0097035 A1* | 4/2010 | Buchholz et al. | ............. | 320/134 |
| 2010/0156352 A1* | 6/2010 | Muta et al. | ................... | 320/134 |

* cited by examiner

*Primary Examiner* — Jermele M Hollington
*Assistant Examiner* — Emily Chan
(74) *Attorney, Agent, or Firm* — Charles C. H. Wu; Charles C.H. Wu & Assocs., APC

(57) ABSTRACT

A battery protection device for disconnecting a plurality of batteries from an inverter to avoid excessive discharge. The device comprises at least one battery connector for connecting to the plurality of batteries, at least one inverter cable for connecting to the inverter, and a plurality of wires for connecting to an AC input. The device gets activated when the AC input to the inverter cuts off and continuously monitors a voltage level of the batteries. Further, the device automatically disconnects the batteries from the inverter at a preset voltage level and shuts itself off to achieve a protection mode wherein the device does not draw any current to avoid further drainage of the batteries. A voltage level of the device is set above a preset voltage for recharging batteries and when the AC input is restored, the device reconnects the batteries to the inverter.

13 Claims, 3 Drawing Sheets

NO DRAIN POWER SAVER

This application claims the benefit of U.S. Provisional Application No. 61/022,500 filed Jan. 21, 2008 and U.S. Provisional Application No. 61/022,488 filed Jan. 21, 2008.

BACKGROUND OF THE INVENTION

1. Technical Field of the Invention

The present invention relates in general to a device that prevents excessive discharge of a rechargeable battery. More specifically, the present invention relates to a device that prevents excessive discharge of the battery by disconnecting loads connected to it and shuts itself off to completely prevent further discharge.

2. Description of the Related Art

With the advancement of technology in electric power generating industry, battery systems have become increasingly important in providing back-up energy in emergency situations. It is essential in emergencies and during a power failure that the battery systems perform as designed. The battery backup system supplies required power to the loads until the battery voltage drops to a certain level. When the battery voltage reaches the certain level, the inverter flashes light indicators or alerts by any alerting means. If the power failure persists for an extended period of time, it may lead to the issue of dead batteries.

There are many systems to protect the backup batteries from excessive drainage. One such system effectively prevents excessive discharge of a rechargeable battery that is either detachable from or internal to an electrical apparatus. The circuit has a battery voltage detector, a comparator to compare the battery voltage with a reference voltage, and a controller to cut-off power drain from a discharged battery when its voltage drops below the reference voltage. In addition, the discharged battery is electrically cut-off from both the load and the comparator.

Another system utilizes a device in conjunction with a battery which is connected to an electrical load. The device includes a microprocessor having a cut off voltage level which is set so that when the battery reaches the cut off voltage, sufficient energy remains in the battery engine ignition. The microprocessor generates an output signal whenever the battery voltage is less than or equal to the cut off voltage level and further the device generates a battery disconnect signal which disconnects the battery from the electrical load. Even though the electrical loads are disconnected, the device keeps drawing power from the battery as the device is still working. If the situation continues, the battery is drained to a point of no return. At the point of no return, the batteries cannot be recharged and has to be replaced at a very high cost.

In order to address the need for monitoring and controlling the battery power consumption, battery low-voltage protectors have been proposed that discloses a set of electrical switches and a control process. Irrespective of whether the voltage drop of the battery is quick or slow, after a pre-defined period of time, the system checks whether the battery voltage is below a pre-determined level. If the battery voltage is below the pre-determined level, the system will cut off the electrical connection between the battery and the load. However, when the battery is cut off from the load, the electrical switches are still connected with the battery, which means that the battery is still in an electricity discharging state.

In the course of developing battery rundown protection systems, a system responsive to the voltage of a battery to disconnect the battery from the electrical loads prior to the point at which the battery becomes too discharged. The apparatus which operates to disconnect the battery from the loads is inhibited and is maintained for a timed period sufficiently long in duration to prevent excessive discharge. While such systems have been adequate for the purpose, the system installation is complex.

Further, a switching device is connected in series with the rechargeable battery and that switching device is turned off to cut off battery discharge when battery voltage drops below a predetermined value. The switching device is maintained in the off state until the battery reaches a voltage slightly higher than the predetermined value. The system then turns the switching device on when the battery reaches a voltage slightly higher than the predetermined value. The system utilizes a hysteresis characteristic between the discharge cut off voltage and the discharge restart voltage. The use of hysteresis between the discharge cut off and restart voltages prevents switching device chattering during self recovery of the battery voltage after discharge cut off. Moreover, setting the hysteresis width between the discharge cut off voltage and the restart voltage to prevent chattering is difficult.

Hence, it can be seen, that there is a need for a device that is simple to install for protecting the batteries from excessive discharge. Further, the needed device would shut down all the loads connected to the battery and shuts itself off to completely prevent excessive battery discharge. Moreover, the needed device would reconnect the loads to the battery on retrieving the AC input for recharging the batteries.

SUMMARY OF THE INVENTION

To minimize the limitations found in the prior art, and to minimize other limitations that will be apparent upon the reading of the specifications, the present invention provides a battery protection device for disconnecting a plurality of batteries from an inverter to avoid excessive discharge. The device comprises at least one battery connector for connecting the battery protection device to the plurality of batteries, at least one inverter cable for connecting the battery protection device to the inverter, a plurality of wires for connecting the battery protection device to an AC input, means for continuously monitoring a voltage level of the plurality of batteries, and means for disconnecting the plurality of batteries at a preset voltage level from the inverter, wherein the battery protection device turns on automatically and monitors the voltage level in the plurality of batteries when the AC input is cut off.

In another aspect of the present invention, a method in accordance with the present invention is a method of installing a battery protection device, comprising of disconnecting a plurality of batteries from an inverter, connecting a battery connector on the battery protection device to the plurality of batteries, connecting an inverter cable on the battery protection device to the inverter, connecting a plurality of wires to an AC input and connecting the AC input to the inverter by means of the battery protection device, thereby bringing the battery protection device in series with the plurality of batteries.

One objective of the invention is to provide a battery protection device that gets activated when an AC input delivered to the inverter by means of said battery protection device cuts off and automatically disconnects a plurality of batteries from the inverter at a preset voltage level to prevent flow of current from the plurality of batteries.

A third objective of the invention is to provide a battery protection device that shuts itself off to achieve a protection mode wherein the device does not draw any current to avoid further discharge of a plurality of batteries when an AC input to an inverter cuts off.

Yet another objective of the invention is to provide a battery protection device that has a voltage level set above a preset voltage for recharging batteries.

Still another objective of the invention is to provide a battery protection device that reconnects a plurality of batteries to an inverter when an AC input is restored.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
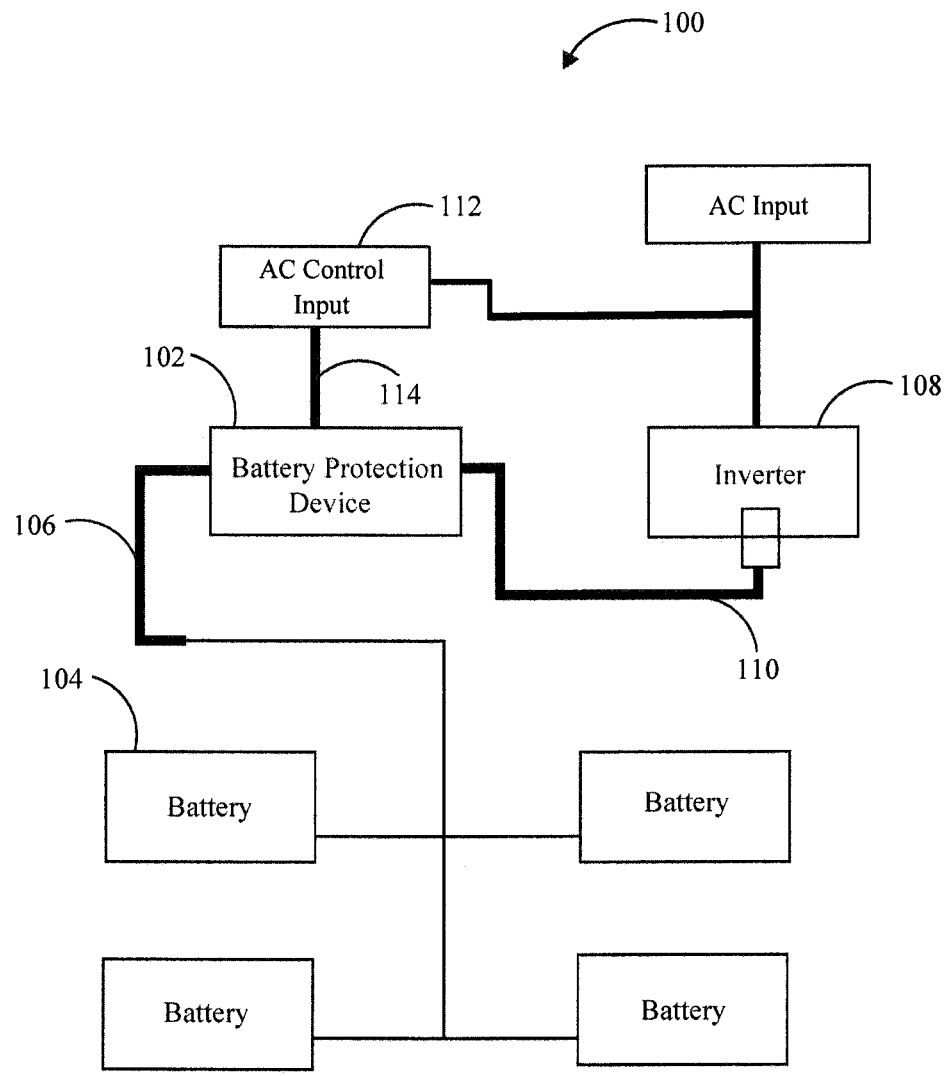
FIG. 1 is a block diagram of the present invention showing the battery protection device connected with the inverter and the plurality of batteries.

FIG. 1 shows a block diagram 100 of the present invention showing a battery protection device 102 connected with an inverter 108 and a plurality of batteries 104. The device 102 comprises of at least one battery connector 106 for connecting the battery protection device 102 to the plurality of batteries 104, at least one inverter cable 110 for connecting the battery protection device 102 to the inverter 108, a plurality of wires 114 for connecting the battery protection device 102 to an AC input 112, means for continuously monitoring (not shown) a voltage level of the plurality of batteries 104, and means for disconnecting (not shown) the plurality of batteries 104 at a preset voltage level from the inverter 108.

The battery protection device 102 is installed by attaching the plurality of wires 114 to the AC input 112 and inverter cable 110 to the inverter 108 thereby bringing the battery protection device 102 in series with the plurality of batteries 104. The AC input 112 is delivered to the inverter 108 by means of the battery protection device 102.

When the AC input 112 is delivered to the inverter 108 by means of the battery protection device 102, the inverter 108 is in a normal operating state. Even when the AC input 112 cuts off, the inverter 108 is in the normal operating state, but the battery protection device 102 turns on automatically and monitors the voltage level in the plurality of batteries 104. Further, the battery protection device 102 automatically disconnects the plurality of batteries 104 from the inverter 108 at the preset voltage level to prevent flow of current from the plurality of batteries 104. The battery protection device 102 shuts itself off to achieve a protection mode to avoid further drainage of the plurality of batteries 104. In the protection mode, the battery protection device 102 does not draw any current.

A voltage level of the battery protection device 102 is set above a preset voltage for recharging the batteries. When the AC input 112 is restored, the battery protection device 102 reconnects the plurality of batteries 104 to the inverter 108. The present invention can be used in industries including traffic industry, rail road industry, elevator industry, or the like.

Figure 2:
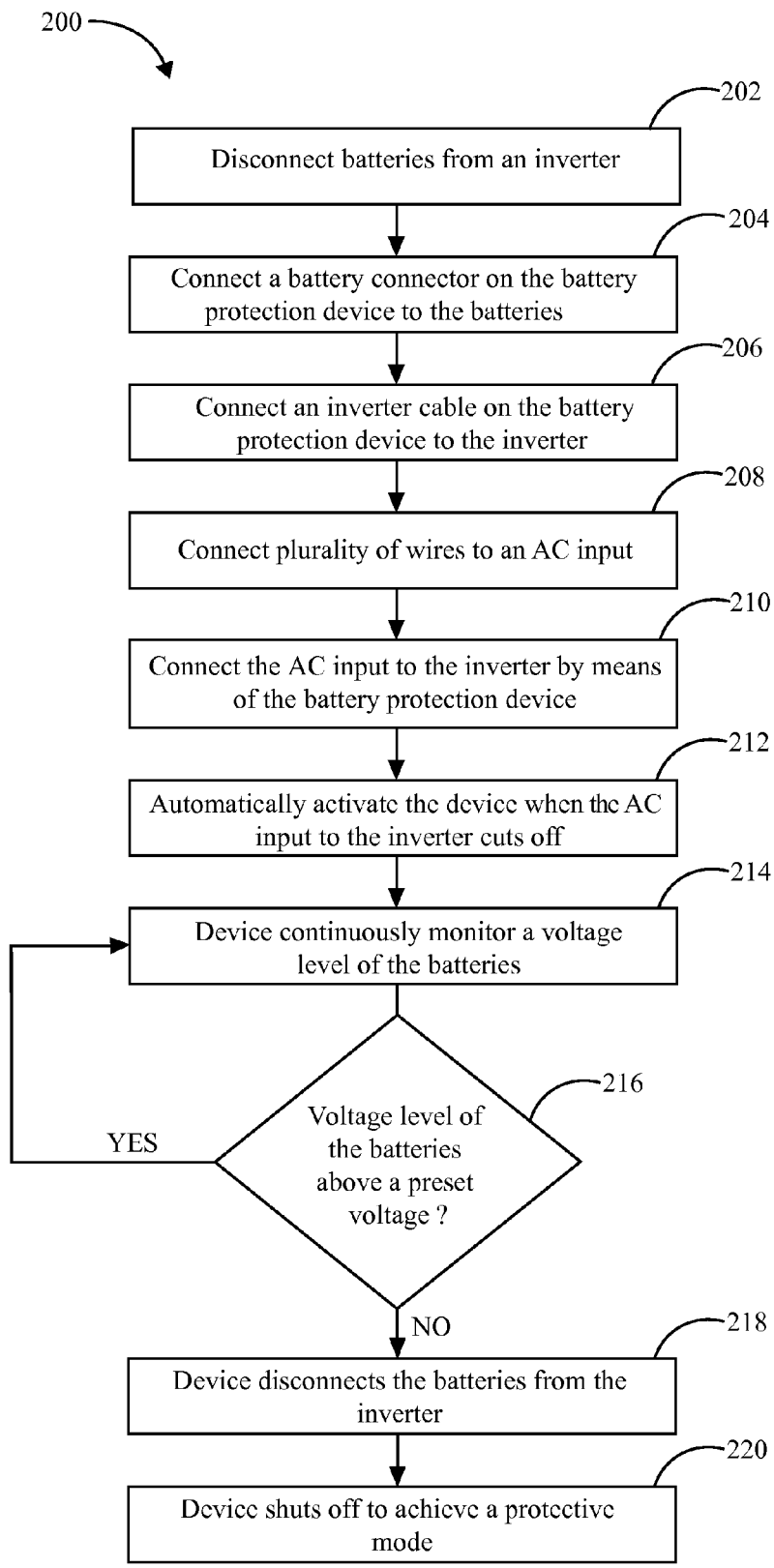
FIG. 2 is an operational flow chart of the present invention.

FIG. 2 shows an operational flow chart 200 of the present invention. The plurality of batteries is disconnected from the inverter as indicated at block 202. The battery connector on the battery protection device is then connected to a plurality of batteries as indicated at block 204. The inverter cable on the battery protection device is connected to the inverter as indicated at block 206. Further, the plurality of wires is connected to the AC input as indicated at block 208. Then, the AC input is connected to the inverter by means of the battery protection device as shown in block 210. When the AC input cuts off, the device gets activated as indicated at block 212. The device continuously monitors the voltage level of the plurality of batteries as indicated at block 214. The device checks whether the voltage level of the plurality of batteries is above the preset voltage as indicated at block 216. As indicated at block 214, if the voltage level of the plurality of batteries is above the preset voltage, the device continuously monitors the voltage level of the plurality of batteries. As indicated at block 218, the device disconnects the plurality of batteries from the inverter if the voltage level of the plurality of batteries is below the preset voltage and the device shuts itself off to achieve the protection mode as indicated at block 220.

Figure 3:
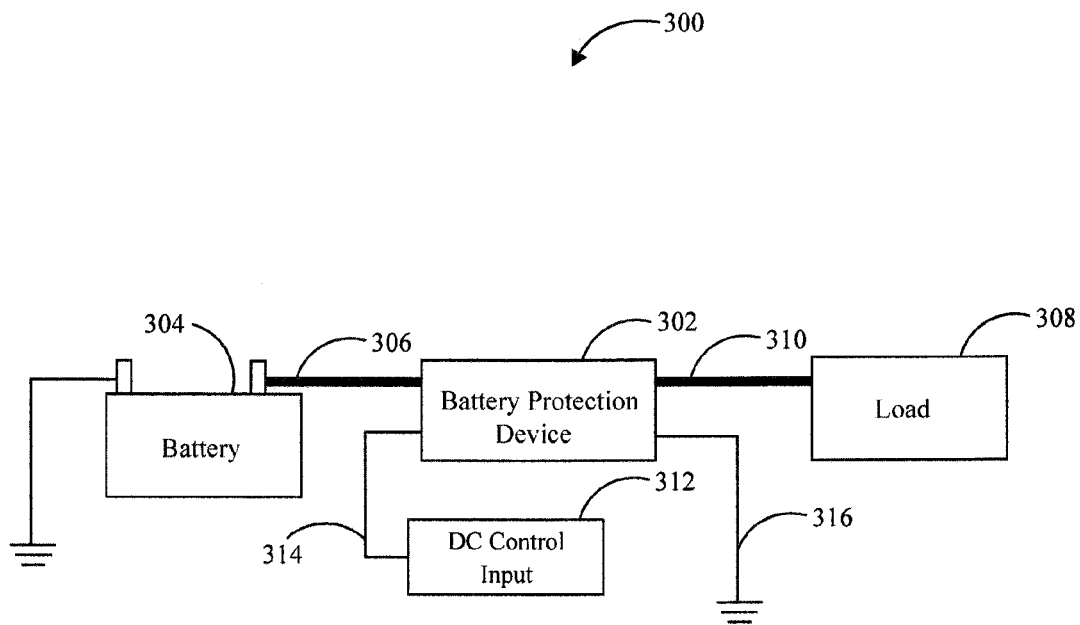
FIG. 3 is a block diagram of the present invention showing the battery protection device for vehicles.

FIG. 3 shows a block diagram 300 of the present invention showing a battery protection device for vehicles 302. At least one wire 306 on the device 302 is connected to a battery 304 and at least one wire 310 on the device 302 which is an output of the device 302 is connected to a load 308. Further, at least one wire 314 connects to an ignition line 312 and at least one wire 316 attaches to ground. The battery protection device 302 constantly monitors a voltage level of the battery 304 in a vehicle (not shown). The device 302 disconnects each and every load 308 attached to it, when the voltage level drops below a preset voltage in the device 302 and shuts itself off to achieve a protection mode. In the protection mode, the device 302 does not draw any current from the battery 304. When the vehicle (not shown) restarts and the voltage exceeds 13.5 volts, the device 302 reconnects the loads 308 automatically to the battery 304.

The battery protection device for vehicles 302 can be used for all vehicles including cars, trucks, emergency vehicles, mobile homes, boats, trailers.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A battery protection device for disconnecting a plurality of batteries from an inverter, comprising:
   at least one battery connector for connecting said battery protection device to said plurality of batteries;
   at least one inverter cable for connecting said battery protection device to said inverter;
   a plurality of wires for connecting said battery protection device to an AC input, said AC input is used as a trigger for controlling the state of the battery protection device;
   means for continuously monitoring a voltage level of said plurality of batteries; and
   means for disconnecting said plurality of batteries at a preset voltage level from said inverter;
   whereby said battery protection device turns on automatically and monitors said voltage level in said plurality of batteries when said AC input is cut off.

2. The battery protection device of claim 1 wherein said device is installed by attaching said plurality of wires to said AC input and inverter cable to said inverter thereby bringing said battery protection device in series with said plurality of batteries.

3. The battery protection device of claim 1 wherein said inverter is in a normal operating state when said AC input is delivered to said inverter.

4. The battery protection device of claim 1 wherein said device is activated when said AC input delivered to said inverter cuts off.

5. The battery protection device of claim 1 wherein said device automatically disconnects said plurality of batteries from said inverter at said preset voltage level to prevent flow of current from said plurality of batteries.

6. The battery protection device of claim 1 wherein said device shuts itself off to achieve a protection mode to avoid further discharge of said plurality of batteries.

7. The battery protection device of claim 1 wherein said device does not draw current in said protection mode.

8. The battery protection device of claim 1 wherein a voltage level of said device is set above a preset voltage for recharging said batteries.

9. The battery protection device of claim 1 wherein said device reconnects said plurality of batteries to said inverter when said AC input is restored and said inverter recharges said plurality of batteries.

10. A method of installing a battery protection device, comprising the steps of:
    disconnecting a plurality of batteries from an inverter;
    connecting a battery connector on said battery protection device to said plurality of batteries;
    connecting an inverter cable on said battery protection device to said inverter; and
    connecting a plurality of wires to an AC input;
    whereby said device is in series connection with said plurality of batteries.

11. The method of claim 10 wherein
    said battery protection device turns on automatically and continuously monitors a voltage level of said plurality of batteries when said AC input delivered to said inverter cuts off.

12. The method of claim 10 wherein
    said battery protection device disconnects said plurality of batteries at a preset voltage level from said inverter.

13. The method of claim 10 wherein
    a voltage level of said battery protection device is set above a preset voltage for recharging said plurality of batteries.

* * * * *